Fig. 4.

INVENTORS
BORIS TERLECKY &
BY RICHARD KRAUSE
ATTORNEY

United States Patent Office 3,263,950
Patented August 2, 1966

3,263,950
TRAILER HITCH
Boris Terlecky, New York, N.Y., and Richard Krause, New Brunswick, N.J., assignors to ACF Industries, Inc., New York, N.Y., a corporation of New Jersey
Original application Oct. 10, 1960, Ser. No. 61,500, now Patent No. 3,183,853, dated May 18, 1965. Divided and this application Aug. 27, 1964, Ser. No. 399,122
20 Claims. (Cl. 248—119)

This application is a division of Serial No. 61,500 filed October 10, 1960, and which is now Patent No. 3,183,853 entitled Sliding Frame Car.

This invention relates to a trailer hitch for railway flat cars.

An object of this invention is to provide an automatic coupling and uncoupling trailer hitch that is easily and automatically extended and retracted to and from a folded position by a tractor loading or unloading a trailer on the flat car.

Other objects will be apparent from the description and drawings in which.

Referring now to the drawings in detail, it will be seen that the railway car C is of the fish-belly sill type supported on trucks T and adapted to be shifted by couplers D. The car is of generally conventional form and has mounted thereon a frame F by means of which different ladings such as a highway trailer G or a cargo container E can be anchored for transit. As shown, the car is carrying one highway trailer and one container. However, it will be obvious from the drawings and description that two trailers may be carried or two or more containers. The anchoring devices for the containers and highway trailers are designed to cooperate each with the other and the frame to permit this universal type of lading, carrying and operation.

Figure 3:
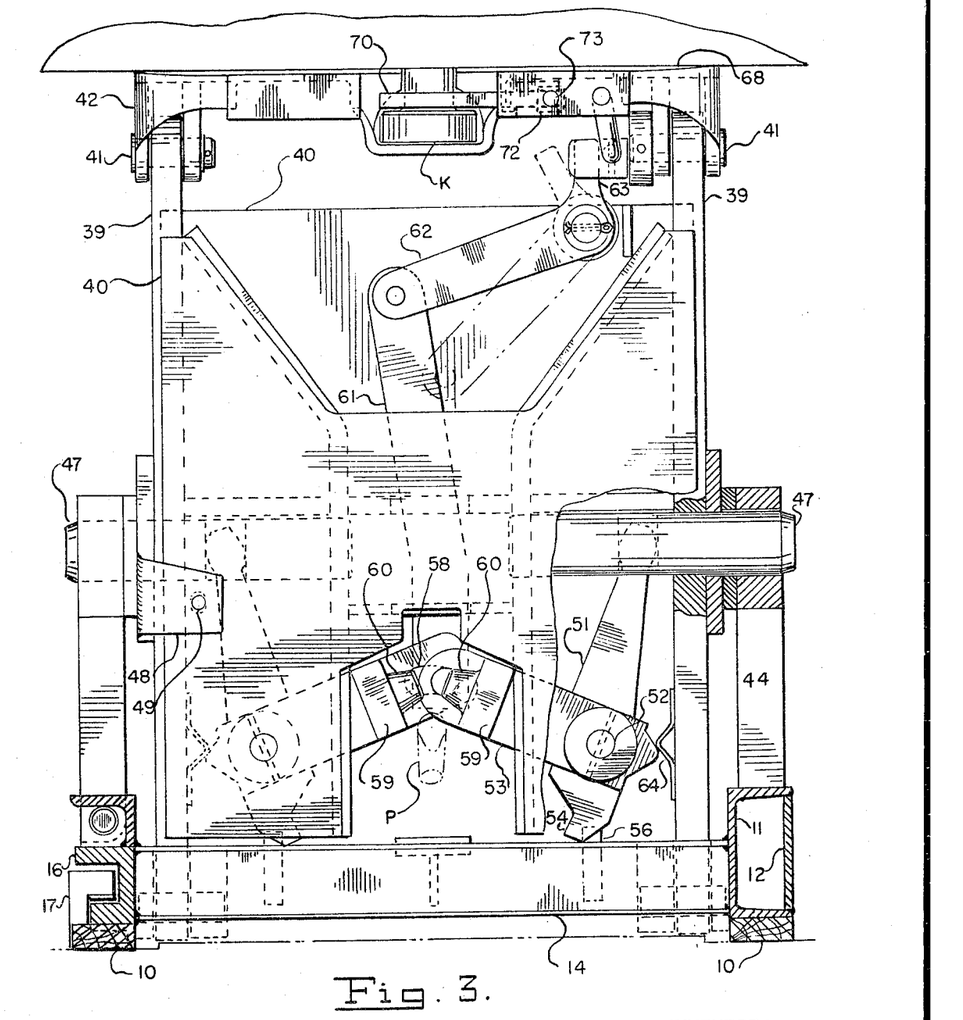
FIGURE 3 is a sectional view taken substantially on line 3—3 of FIGURE 2.

The frame F is mounted on wood or other slides 10 fastened to the top surface of the car and are adapted to support channel form side members 11 reenforced by side plates 12 to form in certain areas box section side members. As clearly shown, the channel sides are spaced apart, yet rigidly connected together by a plurality of cross members 14, which not only serve as ties, but also serve for other purposes, as will be shown later. In order to hold the frame against lateral and vertical movements relative to the car, portions of the channel sides are cut away to receive blocks 16 (FIG. 3) which blocks are not only slidable on the slides, but also are provided with a recess into which the inturned legs of the retainers 17 may extend. These retainers being firmly attached to the car structure thereby preventing both lateral and vertical movement between the car and the frame. While it is preferable to have the retainers at the outer side of the frame sides, they also will be placed inwardly of the frame members as best shown in FIG. 6, in which instance they will engage ledges 18 secured in any manner such as by welding to the frame side members as best shown in FIGS. 6 and 9.

Figures 5, 6:
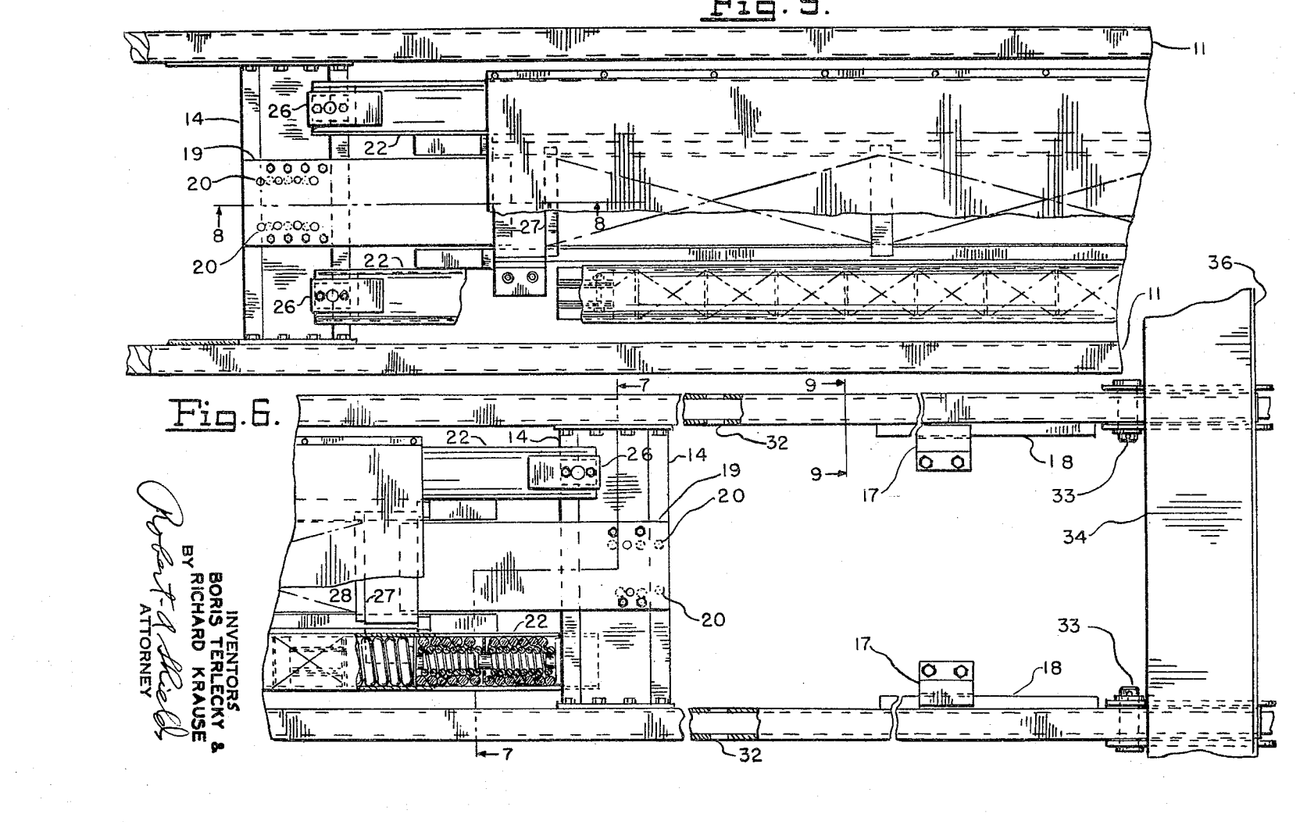
FIGURES 5 and 6 are plan views which taken together show the central section of the structure shown in FIGURE 2 and with parts broken away to better show details.
Figure 7:
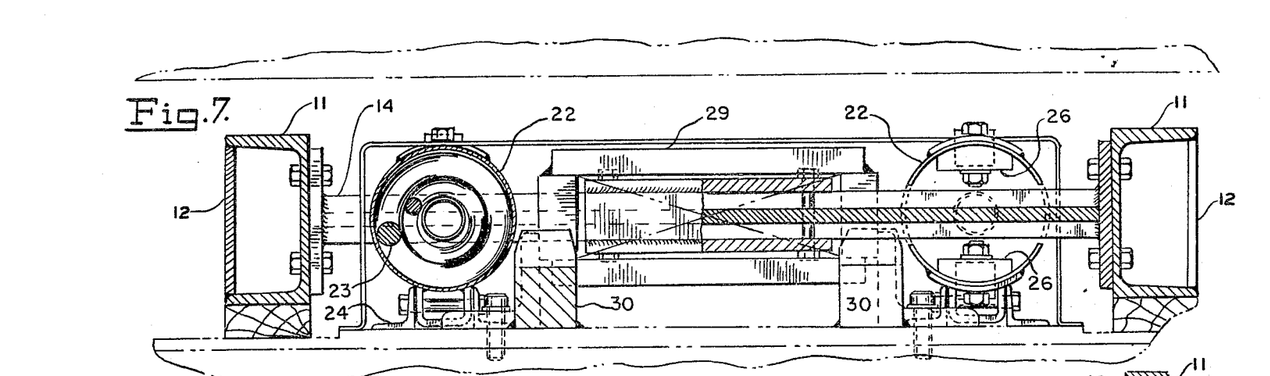
FIGURE 7 is a sectional view showing the cushioning means and taken on line 7—7 of FIGURE 6.

Two of the cross ties as shown in FIGS. 5 and 6 are spaced a considerable distance apart and to these cross ties are attached plates 19 by means of bolts adapted to engage offset and stagger holes 20 whereby the position of the plates on the cross ties may be adjusted to thereby modify the action of the cushioning unit later to be described. The plates 20 extend toward each other and are welded together by means of an interposed spacer bar 21 which spacer bar will in effect serve as a ram for imposing load forces on cushioning units carried between the rams. As clearly shown, two tubular members 22 are mounted to the adjacent frame sides and inwardly thereof and these tubular members carry therein resilient metallic devices such as springs 23. As best shown in FIG. 7, the tubular members 22 are anchored as at 24 to a base plate member which attached to the floor of the car. At the ends of the tubes are anchored spaced stops 26 against which followers bear to transmit or receive pressure to and from the springs 23. The followers will bear against the cross ties to which the rams are attached and thus will back up the followers when load causes relative shift between the frame and the car structure.

Figures 8, 9:
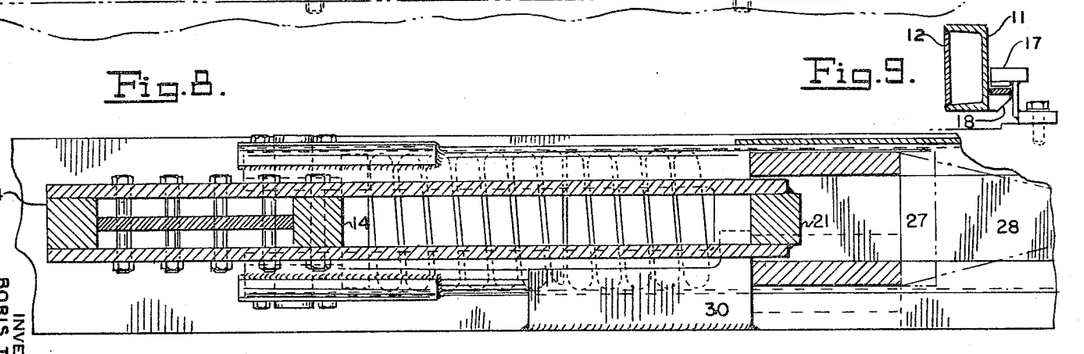
FIGURE 8 is an enlarged sectional side view showing the spring and ram arrangement of the cushioning means taken on line 8—8 of FIGURE 5.
FIGURE 9 is a fragmentary sectional view taken on line 9—9 of FIGURE 6.

As best shown in FIGS. 5, 6 and 8, the ram structures 21 are spaced from followers 27 which are placed at the ends of the cushioning units 28 previously referred to. Preferably, these cushioning units are formed of rubber and mounted within a casing 29. The followers 27 as best shown in FIG. 7 extend to the side of the casing and will engage stops 30 welded or otherwise secured to the base plate.

From the preceding it will be seen that movement of the frame relative to the slides will cause compression first of the metallic springs and then of the non-metallic or rubber cushioning units 28. For example, considering FIGS. 5 and 6 which show the complete cushioning arrangement, movement of the right hand cross ties under action of the frame relative to the car will cause the cross tie to compress the springs 23 within the tubes with their motion being prevented by the stops 26 at the opposite ends of the tubes and due to the attachment of the tubes to the base plate. After springs 23 have been compressed slightly, then the ram shown in FIG. 6 will contact its follower 27 and compress the cushioning units 28 with these units being held by the follower at the opposite end of the units. This follower in turn being held by the stops 30 attached to the base plate. Movement of the cross bars or ties relative to the tubes is permitted by means of slots formed in the ends of the tubes. The degree of compression of springs 23 prior to contact of ram 21 with the cushioning unit 28 can be readily adjusted through the stagger bolt and hole arrangement 20 previously described.

The frame side members in the zones of the box section form are pierced as at 32 to receive pins 33 which pins extend through downwardly extending brackets welded or otherwise secured to cross beams 34. These bars or beams are provided with upturned ends 36 for the purpose of engaging the end walls of containers E. Different size containers can be accommodate by shifting the position of the cross bars or beams relative to the frame and engaging the pins in the proper holes. During times when the car will be used for carrying highway trailers, these cross bars or beams 34 will be removed from the frames and stowed in the space between the cushioning units previously described and the trailer mounting hitch later to be described.

Figure 1:
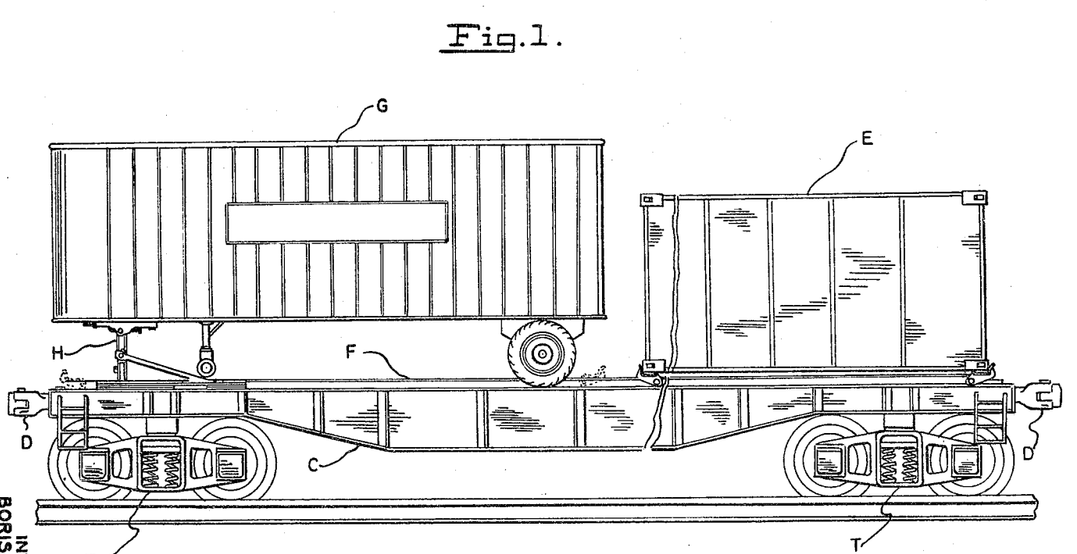
FIGURE 1 is a side view of a flat car with a trailer hitch and container mount combination in accordance with a preferred embodiment of the invention.
Figure 2:
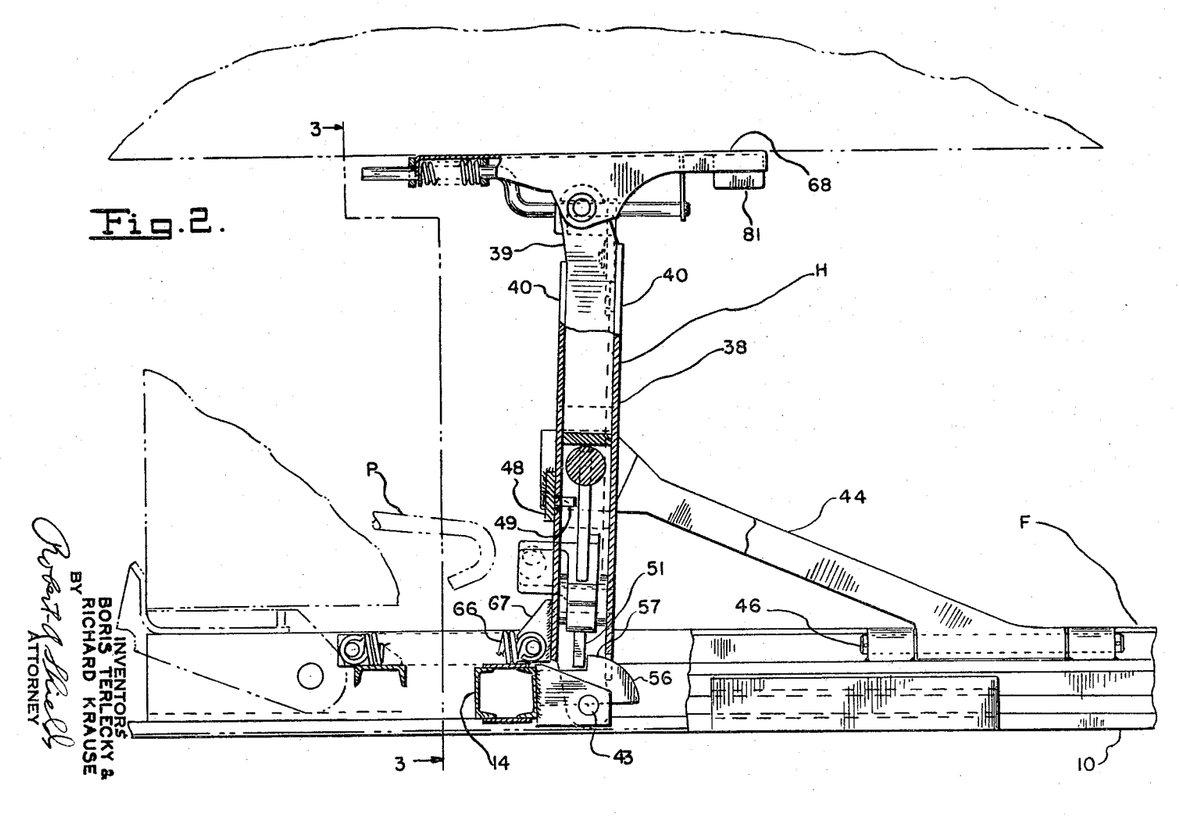
FIGURE 2 is a side view partly in section of the left end portion of the structure shown in FIGURE 1.

In order to accommodate and anchor trailers on the car, the frame F carries a retractable and extensible trailer hitch H. This hitch is preferably of the automatic type which can be raised and lowered by the tractor used to move the trailer and will when in the down-folded position be below the plane of the bottom of the containers that are resting on cross beams 34. The trailer hitch, as shown, is formed with a vertical strut structure 38 made up of side pieces 39 to which are welded spaced plates 40, thereby forming an extremely rigid strut with spaces therein for mounting certain parts later to be described. The upper ends of the side pieces 39 receive pivot pins 41 by means of which a fifth wheel 42 may be pivotally mounted on the strut. The lower ends of the side pieces are pivotally mounted as at 43 to brackets welded or otherwise secured to a heavy box section beam forming one of the cross ties 14, as shown in FIG. 2. In order to hold the vertical strut in its vertical or extended position, diagonal arms 44 are provided having their lower ends offset and bored to receive a longitudinally extending pin 46 mounted in bearings securely welded or otherwise secured to the frame side members 11. By this arrangement, any thrust on arms 44 in either tension or compression will be absorbed by the bearing brackets and not by the pivot pin. The upper ends of arms 44 will in the extended position of the hitch overlap the sides of side pieces 39 and these upper ends are pierced to receive locking pins 47. The arms 44 also carry at their upper ends an inwardly inturned flange 48 to which is attached a locating pin 49 adapted to enter a slightly elongated hole in one of the spaced plates 40 of the vertical strut. In order to operate the locking pins 47, they are engaged by the upper ends of arms 51 pivoted as at 52 for swinging in unison with a laterally extending operating arm 53. The lower ends of pivot members 52 are shaped to provide a ledge shoulder 54. This shoulder during the major portion of the raising and lowering of the hitch will rub against the side of hook shaped cam members 56 rigidly secured to the cross beam or tie adjacent the brackets carrying pivot 43. This hook shaped cam member has a ledge 57 along which the side of the lower end of arm 51 may move, as shown in FIG. 2. The operating arms 53 have their adjacent ends overlapped for a pin and slot connection 58 whereby the arms must move in unison. Each arm adjacent the pin and slot connection is provided with an outstanding projection 59 on which is formed a truncated conical lug 60. These lugs are of such a length that when the operating arms are in the position shown in FIG. 4, they will be substantially in abutment with each other. The pin of the pin and slot connection 58 is connected to the lower end of a pull link 61, the upper end of which is pivotally connected to a bell crank 62 pivoted on one of the plates 40 and having an extended end 63.

Figure 4:
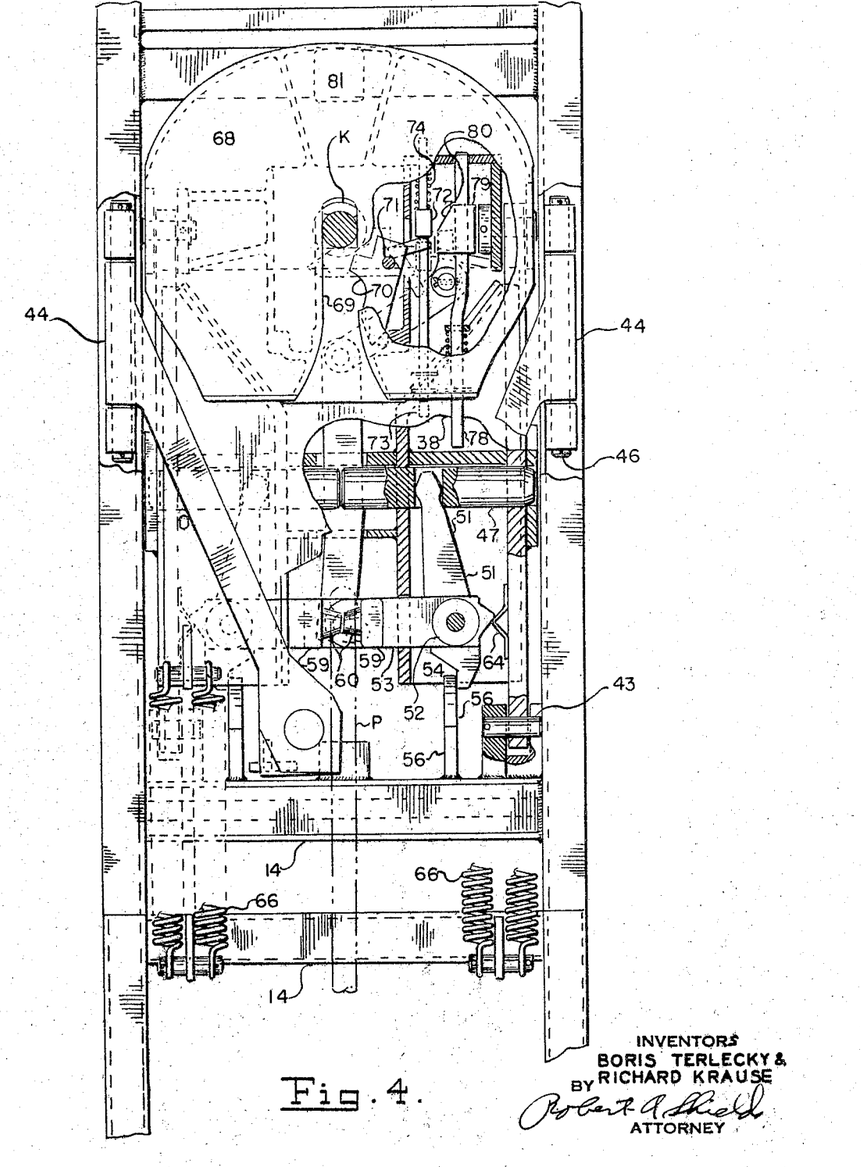
FIGURE 4 is a plan view of the mechanism shown in FIGURE 3 but in a retracted position.

Neglecting for the time being, the equipment that is mounted on the upper ends of side pieces 39, it will be seen that the operating mechanism necessary for erection or retraction of the hitch has been described. For with the parts in the lowered position, as shown in FIG. 4, with the arms 44 lying on top of the vertical strut 38, it will be seen that the conical lugs 60 are substantially in contact. With the parts in this position, if a hook represented as P carried by the tractor is lowered so that its hooked end will engage over the conical lugs, then a movement of the tractor will exert a pull on the lugs. A pull exerted on the lugs will tend to make them separate but they can not separate since the shoulder 54 of arm 51 will be rubbing on the side edge of cam member 56. Accordingly, the vertical strut will have to start moving from a horizontal toward a vertical position. During movement of the strut toward a vertical position, the diagonal arms will have to swing upwardly and outwardly about their longitudinal pivots 46. Continued upward movement of the vertical strut will bring it to a substantially vertical position at which time the flange 48 and location pin 49 will function to hold the diagonal arms in their proper position and at the same time prevent movement of the vertical strut past its proper upright position. Simultaneous with this location of the diagonal arms, with respect to the vertical strut, the shoulder 54 can snap past ledge 57 of the cam member with the result that now the strain on the cam lugs will cause them to separate, releasing the hook P and bringing the parts to the position shown in FIG. 3. In other words, the locking pins 47 will be projected laterally, locking the diagonal arms to the vertical strut and forming a rigid triangular structure rigidly mounted on a sliding frame. In order to prevent these various parts from vibrating either from the position shown in FIG. 4 or the position shown in FIG. 3, the operating arms 53 have their ends forming cam surfaces adapted to snap over the high point of a spring catch member 64 carried by the side pieces 39. Also, to assist in raising the structure, but primarily to resist shock in dropping to the retracted position, counter balance springs 66 are attached at one end to a frame cross member and at the other end to brackets 67 welded or otherwise secured to one of the spaced plates 40 at a point removed from the lower pivot 43. It is to be noted that these springs and their mounting, both extended and contracted, will be below the top plane of the sliding frame F.

The fifth wheel structure or the structure which is adapted to cooperate with the mounting surface on the highway trailer is, as previously noted, pivoted at 41 on the upper ends of the side pieces 39. The fifth wheel structure previously designated 42 is provided with the usual top bearing surface 68 adapted to support the trailer and with an opened slot structure 69 adapted to receive the king pin K integrally attached to the trailer. The king pin will be held in tight engagement in the fifth wheel structure by any suitable lock of the automatic type. For example, as best shown in FIG. 4, this automatic lock may consist of a locking dog 70 movable across the path of the king pin with its movement being that of pivotal action about pin 71. Movement of the locking dog will be prevented by a locking bar 72 fastened on a push rod 73 suitably mounted in the fifth wheel structure and constantly urged toward a locking position by a spring 74. Any suitable trigger means is provided to hold the push rod and the locking dog in the full line position of FIG. 4. With the parts in this position, a king pin K entering the fifth wheel slot will trip the trigger and move the locking dog to its locked position shown in line and double dot position with the locking bar moving also to its line and double dot position and preventing movement of the locking dog.

In order to operate the extended end 63 and bell crank 62 a push rod 78 is provided slidably mounted in the fifth wheel assembly and carrying a block 79 having one tapered face 80 adapted to engage the extended arm 63. In the down position, as shown in FIG. 4, the arm 63 and tapered face 80 will not be in contact since the fifth wheel will be folded relative to the strut approximately 90 degrees from its true position. When, however, the strut is in its vertical position, the fifth wheel member 42 will be in its substantially horizontal position. Any suitable yielding means may be utilized to bring the fifth wheel to a substantially horizontal position during erection of the hitch. It will, of course, be brought to full horizontal position, upon engagement with the trailer mating surface and upon locking of the king pin. As best shown in FIG. 2, the fifth wheel member 42 is provided with a block of rubber or cushion material 81 adapted to strike and rest upon a cross bar, as shown in FIG. 4.

With the hitch in the lowered position of FIG. 4 the trailer and the tractor can back there over with the operator roughly spotting the king pin in its proper position. The hook P will be lowered by the operator for engagement with the conical lugs 60. The tractor fifth wheel lock will then be released and the driver will start moving out from under the trailer load. A relatively slight forward movement of the tractor relative to the trailer will snap the hitch toward its upright position, as previously described and the tapered slot of the hitch fifth wheel plate will engage with the trailer king pin and automatically lock thereon as described. Simultaneous with this locking, the hitch will have reached its locked position and the tractor hook will automatically release thereby leaving the trailer fully supported on the hitch prior to the time that the tractor fifth wheel has moved fully out from beneath the trailer. In unloading the trailer, the driver merely has to back under the trailer, picking up this part of the load on his fifth wheel and with his continued movement first operating push rod 78 and through the tapered surface 80 and end 63 he will unlock the mechanism moving pins 47 out of the diagonal arms. About the time that this action occurs, the backing tractor will strike push rod 73 and release hitch fifth wheel lock, thereby permitting the whole assembly to drop under control of the counter balance springs to the position of FIG. 4. The driver may then remove the trailer after locking, of course, his tractor carried fifth wheel lock.

From the preceding description, it will be apparent that a convertible railway car has been provided which generally is a flat car upon which is removably mounted a sliding frame held against all motion other than that longitudinally of the car and with the longitudinal motion under control of a resilient means which can be readily disconnected from the car. It will also be apparent that the lading whether it be a container or a highway trailer will be anchored to and under control of the sliding frame which in turn is controlled by the resilient means. In the preferred form shown, the cross beams for carrying the containers may be positioned in any necessary location along the frame. Also the trailer hitch by means of which the trailer is supported and anchored to the frame has been shown as of the automatic type. Obviously it could be of the non-automatic type, the only main requirement being that it be of a type that will fold downwardly to permit passage of trailers and tractors thereover and that in its folded position it does not extend above the supporting surface of the beams supporting the containers. It will also be apparent from the description that various modifications may be made without departing from the scope of the invention as defined by the following claims.

What is claimed is:

1. In a flat car trailer hitch, a strut pivotally mounted at one end on the car for upward and downward swinging movement longitudinally of the car, a wear plate pivotally mounted at the other end of said strut and defining a slot operable to receive a trailer king pin, braces pivotally connected to the car and overlapping said strut when the latter is in its lowered position, whereby said braces swing upwardly and outwardly transversely of the car during upward movement of said strut, and means for connecting the free ends of said braces to said strut to hold said strut in a raised position.

2. In a railway flat car trailer hitch, a strut hinged at one end to the car for upward and downward swinging movement, a trailer receiving member pivoted to the other end of said strut, braces hinged at their lowered ends to the car near said strut, said braces being swingable between an extended and a retracted position and in a direction transverse to the movement of said strut, a stop at the upper end of each of said braces operable to hold said strut in its final raised position, pins carried by said strut for transverse movement relative thereto, and means to project said pins transversely of said strut into said braces to rigidly lock the braces and strut together.

3. In a railway flat car trailer hitch, a strut hinged at one end to a part of the car and movable between an extended and a retracted position by swinging movement longitudinally of the car, braces hinged at their lower ends to a part of the car adjacent to said strut for angular swinging movement transverse to the movement of said strut, apertures at the upper ends of said braces, stop means supported at the upper end of each of said braces operable to limit said strut in its swinging movement, pins supported by said strut for transverse actuation, means to move said pins transversely of said strut into said apertures to lock said strut and braces in extended position, and means cooperating with said first named means to hold said pins in said apertures.

4. An automatic tractor operable flat car trailer hitch, comprising, an extendable strut mounted on the car for swinging movement longitudinally of the car, a pair of braces mounted on the car for swinging movement transversely of the car, said braces having their lower ends hinged to the car near said strut and their upper ends apertured, stops supported at the upper free ends of said braces and operable to limit the movement of said strut to its extended position, a pair of counter-rotatable bell cranks pivotally mounted on said strut, each bell crank having an upwardly extended arm and an inwardly extended arm, a tapered lug connected to each of said inwardly extended arms, said lugs having free ends in close proximate position to each other when said inwardly extended arms are in a horizontal position, said lugs being adapted to be engaged by a tractor carried hook, lock pins supported by said strut for transverse actuation, said lock pins being connected to the upwardly extended arms of said bell cranks, and a lock cam adapted to engage portions of said bell cranks to restrain said bell cranks from rotation until said strut is in its extended position, said lock cams also being adapted to release said bell cranks for counter-rotation to thereby actuate said lock pins transversely of the strut into said brace apertures to lock said strut in its extended position and to simultaneously separate said lugs and release the tractor hook.

5. In a flat car tractor operable trailer hitch, a strut pivotally mounted at its lower end to a part of the car for swinging movement longitudinally of the car between a retracted and an extended position, a fifth wheel wear plate pivotally mounted on the upper end of said strut and adapted to engage and support a trailer, first means to lock the trailer on said wear plate, a pair of braces pivotally connected to the car for swinging movement transversely of the car, pin means to lock said braces to said strut, and second means carried by said wear plate to control unlocking movement of said pin means, and third means carried by said strut and operating to control locking movement of said pin means when said strut and braces are in the extended position, said third means including tapered lugs engageable by a tractor carried hook whereby said strut may be raised and locked in extended position, and said second and first means being sequentially engageable by the tractor to sequentially move said pin means to unlock said braces and strut and to unlock the trailer from the wear plate.

6. In a flat car, a tractor operable trailer hitch comprising a strut pivotally mounted at its lower end to a part of the car for swinging movement longitudinally of the car between a retracted and an extended position, a fifth wheel wear plate pivotally mounted on the upper end of said strut and adapted to engage and support a trailer, first means to lock and unlock the trailer on said wear plate, a brace pivotally connected at one end to the car for swinging movement between a retracted position and an extended position, latching means for connecting said strut to the car through said brace, and second means extending forwardly of said strut to control the release of said latching means, and third means carried by said strut and operating to control locking movement of said latch means when said strut and brace are in the extended position, and means including a member engageable by a tractor carried hook whereby said strut may be raised and latched in extended position, and said second and first means being responsive to impact by the tractor to sequentially operate said latching means to unlatch said strut and then to operate said first means to unlock the trailer from the wear plate.

7. A tractor operated trailer hitch for a railroad flat car comprising a frame, shock absorbing means connecting said frame to the car for cushioning longitudinal movements of said frame relative to the car, a strut pivotally mounted at one end on said frame for longitudinal swinging movement between a retracted position adjacent said frame and an upright operative position, a wear plate pivotally mounted on the other end of the strut for supporting a trailer, a brace pivotally connected at one end to the car for swinging movement from a retracted position adjacent the deck of the car to a raised operative position in which it extends diagonally from the car to an upper portion of the strut, coupling means connecting said brace to said strut, lifting means engageable by a tractor hook for enabling the hitch to be raised by the tractor, and means responsive to movement of the strut into its upright position for enabling the lifting means to release the tractor hook.

8. A tractor operated trailer hitch for a railroad car comprising a strut, means for mounting one end of the strut on the car for movement between a retracted position and a raised operative position, a wear plate mounted on the other end of the strut for supporting a trailer, lifting means connected to the strut engageable by a tractor hook for enabling the hitch to be raised by the tractor, and means responsive to movement of the strut into its operative position for enabling the lifting means to release the tractor hook.

9. A trailer hitch according to claim 8, including means positioned for impacting by the rear of the tractor and responsive to a tractor impact for restoring said lifting means to its hook engageable condition.

10. A tractor operated trailer hitch for a railroad car comprising a strut pivotally mounted at one end on the car for longitudinal swinging movement between a retracted position adjacent the deck of the car and an upright operative position, a wear plate pivotally mounted on the other end of the strut for supporting a trailer and latching the king pin thereof, a brace pivotally connected at one end to the car for swinging movement from a retracted position adjacent the deck of the car to a raised operative position in which it extends diagonally from the car to an upper portion of the strut, lifting means engageable by a tractor hook for enabling the hitch to be raised by the tractor, and means responsive to movement of the strut into its upright position for connecting the strut to the car through the brace and for enabling the lifting means to release the tractor hook.

11. A hitch according to claim 10, including means on the hitch responsive to an impact by the tractor for removing the connection of the strut to the car through the brace.

12. A hitch according to claim 10, including means on the hitch responsive to an impact by the tractor for restoring the lifting means to its hook engageable condition.

13. A hitch according to claim 10, including means in said wear plate responsive to an impact by said tractor for unlatching the king pin.

14. A tractor operated trailer hitch for a railroad car comprising a strut mounted at one end on the car for pivotal movement between a retracted position adjacent the deck of the car and an upright operative position, a wear plate pivotally mounted on the other end of the strut for supporting a trailer, a brace connected at one end to the car for pivotal movement from a retracted position adjacent the deck of the car to a raised operative position in which it extends diagonally from the car to an upper portion of the strut, coupling means connecting the other end of said brace to said strut, releasable means for coupling the hitch to the tractor for enabling the hitch to be raised by the tractor, and means responsive to movement of the strut into its upright position for releasing said releasable means to uncouple said strut from the tractor.

15. A tractor operated trailer hitch for a railroad car comprising a strut pivotally mounted at one end on the car for longitudinal swinging movement between a retracted position adjacent the deck of the car and an upright operative position, a wear plate pivotally mounted on the other end of the strut for supporting a trailer, releasable means on said hitch for coupling said hitch to the tractor for enabling the hitch to be raised by the tractor to said operative upright position, and means responsive to movement of the strut into its upright position for releasing said releasable means to uncouple said hitch from the tractor.

16. A tractor operated trailer hitch for a railroad car comprising a strut pivotally mounted at one end on the car for longitudinal swinging movement between a retracted position adjacent the deck of the car and an upright operative position, a wear plate pivotally mounted on the other end of the strut for supporting a trailer, latching means responsive to movement of said strut to said upright operative position to latch said strut in said upright operative position, releasable means on said hitch for coupling said hitch to the tractor for enabling the hitch to be raised by the tractor to said upright operative position, and means responsive to actuation of said latching means in said upright operative position of said strut to release said releasable means to uncouple said hitch from said tractor.

17. A trailer hitch for a railroad car comprising a strut pivotally mounted at one end on the car for forward upward and rearward downward swinging movement longitudinally of the car between a substantially upright position and a lowered position close to the car, a wear plate pivotally mounted on the other end of said strut for receiving a trailer king pin, a brace, means for pivotally connecting one end of the brace to the car rearwardly of the pivot of the strut so that said brace is caused to drop from an upper position to a lowered position in which it overlies and is supported by a portion of said strut when the latter is in its lowered position, whereby raising said strut lifts said brace to its upper position, cushioning means connecting the pivoted end of the brace and the car for cushioning longitudinal movements of the brace, means including said brace for holding said strut braced in its upright position and for releasing said strut for downward movement, and lifting means engageable by a tractor hook or the like for enabling the hitch to be raised by a tractor.

18. A trailer hitch for supporting a trailer on a railroad car comprising a strut, means for mounting one end of the strut on the car for forward upward and rearward downward swinging movement longitudinally of the car between a substantially upright position and a lowered position close to the car, a wear plate pivotally mounted on the other end of said strut and having a slot for receiving a trailer king pin, a diagonal brace extending between an upper portion of the strut and the car, means for pivotally mounting the lower end of the brace on the car rearwardly of strut for enabling said brace to swing from an upper position to a lowered position in which it overlies a portion of said strut when the latter is in its lowered position, whereby raising said strut raises said brace, means located between the lower end of the brace and the car for cushioning longitudinal movements of the brace, and means for releasably connecting the brace to the strut for bracing said strut in its upright position.

19. A trailer hitch for supporting a trailer on a railroad car comprising a strut, means for mounting one end of the strut on the car for forward upward and rearward downward swinging movement longitudinally of the car between a substantially upright position and a lowered position close to the car, a wear plate pivotally mounted on the other end of said strut and having a slot for receiving a trailer king pin, a diagonal brace extending between an upper portion of the strut and the car, means for latching said brace in its strut bracing position, said brace comprising two portions pivoted to the car so as to enable said portions to fold over each other in a lowered position adjacent the strut in its lowered position, means responsive to a trailer-tractor impact for unlatching said latching means and thereby enabling said strut to swing to its lowered position and said brace portions to fold over each other in their lowered position, and lifting means engageable by a tractor hook or the like for enabling the hitch to be raised to an upright position.

20. A hitch according to claim 19, including cushioning means connected between the car and the lower end of the brace for cushioning longitudinal movements of the brace relative to the car.

References Cited by the Examiner

UNITED STATES PATENTS

| | | | |
|---|---|---|---|
| 1,751,717 | 3/1930 | Romine | 214—152 |
| 2,358,216 | 9/1944 | Den Besten | 280—455 |
| 2,452,796 | 11/1948 | Skibsted | 280—150 |
| 3,035,801 | 5/1962 | Mangels | 248—119 |
| 3,041,028 | 6/1962 | McDowell | 248—119 |
| 3,050,320 | 8/1962 | Clejan | 287—20 |
| 3,102,646 | 9/1963 | Clejan | 214—152 |
| 3,164,346 | 1/1965 | Bateson | 248—119 |

CLAUDE A. LE ROY, *Primary Examiner.*

FRANK L. ABBOTT, *Examiner.*

R. P. SEITTER, *Assistant Examiner.*